(12) United States Patent
Cho et al.

(10) Patent No.: US 7,039,944 B1
(45) Date of Patent: May 2, 2006

(54) DIGITAL DATA FILE MANAGEMENT METHOD AND RECORDING MEDIUM FOR RECORDING DIGITAL DATA FILE MANAGEMENT PROGRAM THEREON

(75) Inventors: Young-Soon Cho, Pyungtaek (KR); Jae-Young Kim, Seoul (KR); Han Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/500,573

(22) Filed: Feb. 10, 2000

(30) Foreign Application Priority Data

Feb. 10, 1999 (KR) .................................... 99-4560

(51) Int. Cl.
*H04L 9/00* (2006.01)
(52) U.S. Cl. .......................................... 726/2; 705/59
(58) Field of Classification Search ............... 713/200, 713/165; 705/59; 709/203, 219; 707/9; 726/2, 26
See application file for complete search history.

(56) References Cited

U.S. PATENT DOCUMENTS 5,982,506 A * 11/1999 Kara ........................... 358/405
6,577,735 B1 * 6/2003 Bharat ......................... 380/286

FOREIGN PATENT DOCUMENTS

EP 0715247 A1 * 5/1996
EP 0715247 A1 * 6/1996

* cited by examiner

*Primary Examiner*—Gregory Morse
*Assistant Examiner*—Thomas Ho
(74) *Attorney, Agent, or Firm*—Birch,Stewart,Kolasch & Birch,LLP

(57) ABSTRACT

The digital data file management method reads a header of the digital data file stored on an external medium. Based on the read header, the digital data file is selectively uploaded and/or managed.

16 Claims, 2 Drawing Sheets

HEADER

DIGITAL DATA FILE MANAGEMENT METHOD AND RECORDING MEDIUM FOR RECORDING DIGITAL DATA FILE MANAGEMENT PROGRAM THEREON

BACKGROUND OF THE INVENTION

1. Field of the Invention

The present invention relates in general to a method for managing digital data files, such as a digital audio data file and a digital video data file, and a recording medium including a program for performing such management.

2. Description of the Prior Art

Generally, an MP3 player is a type of digital data player for processing digital data files. The MP3 player is new notional, portable digital audio equipment capable of readily downloading and reproducing desired music from a computer communication network using an audio data compression coding technique prescribed in MPEG1 Layer3. In particular, the MP3 player has few faults and excellent sound quality because it stores music in the form of an MP3 file. Further, the MP3 player is small in size and light in weight, thereby allowing high activity uses such as being carried during physical exercise. For these reasons, this product is being touted as an alternative to a portable cassette tape recorder and compact disk (CD) player.

For use in such an MP3 player, a digital data file is downloaded from a file supplier (server) to a personal computer terminal via a communication network such as the Internet and, in turn, to the MP3 player. The digital data file downloaded as mentioned above may be uploaded from the MP3 player to the personal computer terminal, thereby causing a problem in regard to copyright infringement.

On the other hand, when the supply of digital data players, like the MP3 player, become more widely spread and issues such a copyright protection are settled between digital data file suppliers and copyright holders, digital data file purchasing routes will be extended to vending machines, encoders, etc. In this case, file uploading from a digital data player to, for example, a personal computer terminal will have to be permitted at least under certain restrictions.

However, there is no conventional technique capable of, when a digital data file is intended to be uploaded from the digital data player to the personal computer terminal, identifying a provider of the digital data file and permitting the uploading within limits in accordance with the identified result. This fact becomes an obstacle to the proliferation of the digital data player.

SUMMARY OF THE INVENTION

Therefore, the present invention has been made in view of the above problems and it is an object of the present invention to provide a method for managing a digital audio data file such as MP3 and a digital video data file such as JPEG and a recording medium including a program for such management.

These and other objects are achieved by providing a method for managing a digital data file, comprising reading a header of a digital data file stored by an external device and controlling whether to upload said digital data file based on said read header.

These and other objects are further achieved by providing a program (or script) embodied on a computer-readable medium for managing a digital data file, said computer readable medium comprising a first program code segment to read a header of a digital data file stored by an external device; and a second program code segment to control whether to upload said digital data file based on said read header.

These and other objects are still further achieved by providing a computer data signal comprising a first signal segment to read a header of a digital data file stored by an external device, and a second signal segment to control whether to upload said digital data file based on said read header.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
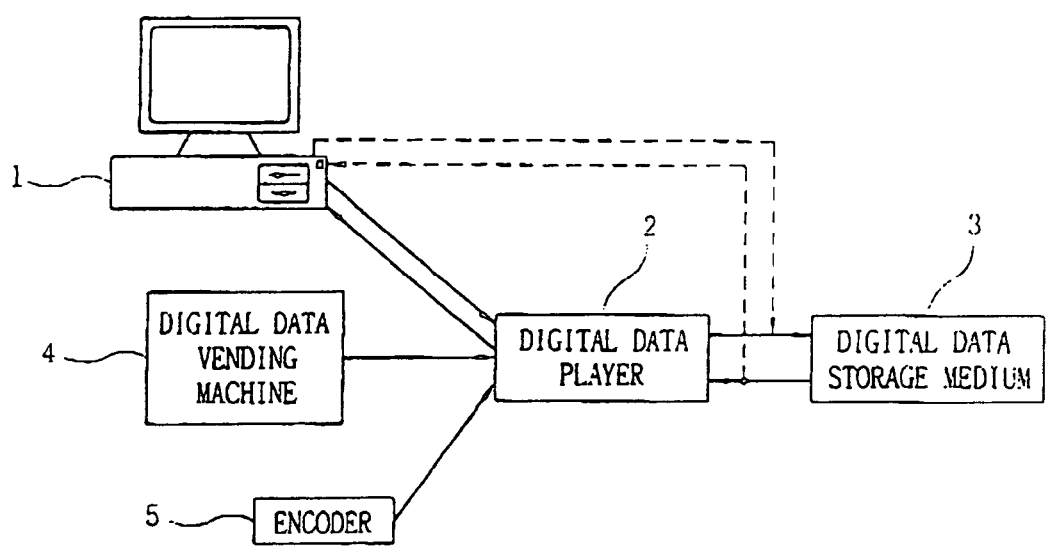
FIG. 1 is a block diagram illustrating the movement of digital data files from/to a digital data player.
Figure 2A:
FIG. 2 is a view illustrating identification codes of digital data files in accordance with the present invention.
Figure 2B:
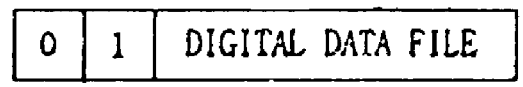
Figure 2C:
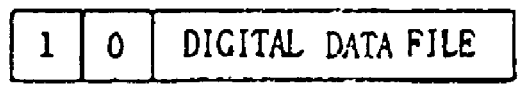
Figure 2D:

FIG. 1 is a block diagram illustrating the movement of digital data files from/to a digital data player, which is provided for the description of a digital data file duplication prevention method according to the present invention. A personal computer terminal 1 is connected to a communication network (not shown) such as the Internet for downloading a digital data file, which is supplied at a charge or free of charge. The personal computer terminal 1 stores the downloaded digital data file on a hard disk therein and reproduces the stored digital data file or downloads it to a digital data player 2. When the digital data player 2 intends to upload its digital data file, the personal computer terminal 1 checks an identification (ID) code in a header of the digital data file and permits the uploading within restrictions in accordance with the checked result. The digital data player 2 stores the digital data file downloaded from the personal computer terminal 1 in a digital data storage medium 3 and reproduces the stored digital data file. Also, the digital data player 2 reproduces an output digital data file received from a digital data vending machine 4 or an encoder 5, or the digital data player 2 uploads the received digital data file to the personal computer terminal 1.

The digital data storage medium 3 is made in a removable form and stores the digital data file from the digital data player 2 therein. Alternatively, as shown by dashed lines, the digital data file is directly downloaded to the digital data storage medium 3, or, within the restrictions associated with the header, is directly uploaded from the digital data storage medium 3 to the personal computer terminal 1.

The digital data vending machine 4 is connected to a communication network such as the Internet and is installed at a roadside or a public place where many people pass, for selling digital data files at a charge. The encoder 5 downloads a digital data file transmitted over a specific transmission line and supplies the downloaded digital data file to the digital data player 2. As with the personal computer terminal 1, digital data files could be directly downloaded from the digital data vending machine 4 or the encoder 5 to the digital data storage medium 3 (not shown).

Now, a detailed description will be given of the digital data file duplication prevention method according to the present invention with reference to FIGS. 1 and 2.

Firstly, the user has to register with a digital data file supplier in order to receive a digital data file from a digital data server (not shown). For user registration, the user is assigned an ID number and password from the digital data file supplier. Then, the user downloads a digital data software player in a software form from the digital data server through the communication network and sets the downloaded digital data software player as a digital data software player in the personal computer terminal 1. Thereafter, in order to download a desired digital data file from the digital data server through the personal computer terminal 1 and communication network, the user may have to pay a corresponding charge to the digital data file supplier and transmits his ID number and password to the digital data server through the personal computer terminal 1 and communication network. The digital data server identifies the user on the basis of the transmitted ID number and password, and supplies the desired digital data file to the user in accordance with the identified result. At this time, the digital data server appends an ID code "01" to a header of the desired digital data file to inhibit that file from being uploaded, and transmits the resultant digital data file to the personal computer terminal 1.

The personal computer terminal 1 stores the digital data file transmitted from the digital data server on the hard disk therein. Under this condition, upon receiving a reproduction request from the user, the personal computer terminal 1 decrypts and reproduces the stored digital data file through the digital data software player. As a result, the user is able to listen to the desired music when the digital data file is an audio file such as an MP3 file and/or view the video when the digital data file is a video file such as a JPEG file at any time through the personal computer terminal 1.

If the user intends to reproduce (listen and/or view) the digital data file purchased along the above path using the digital data player 2, then the personal computer terminal 1 downloads the purchased digital data file to the digital data player 2. Then, the digital data player 2 stores the downloaded digital data file in the digital data storage medium 3, which is preferably made in the form of a removable memory card. If the user requests the digital data player 2 to reproduce the digital data stored in the digital data storage medium 3, then the digital data player 2 reads the stored digital data file from the storage medium 3 and reproduces it through a decoder therein. As a result, the user can listen and/or view the digital data file anywhere using the digital data player 2. On the other hand, in the case where a user tries to load a digital data file received along the above path, but via a different personal computer, to the personal computer terminal 1 or to upload it through the digital data player 2, the personal computer terminal 1 identifies the digital data file on the basis of the ID code "01" and thus inhibits it from being loaded or uploaded.

Secondly, an ID code "00" is assigned to a header of a digital data file which is distributed without restriction (e.g., free of charge) to the personal computer terminal 1 on the communication network. If the user receives such a digital data file through the personal computer terminal 1, he can reproduce the received file freely through the personal computer terminal 1 or digital data player 2 as stated previously. Namely, when the user tries to upload the unrestricted digital data file from the digital data player 2 to the personal computer terminal 1, the personal computer terminal 1 identifies the digital data file as unrestricted on the basis of the ID code "00", and thus permits that file to be uploaded without restriction.

Thirdly, an ID code "10" is assigned to a header of a digital data file which is distributed with limited restrictions (e.g., at a charge from the digital data vending machine 4 installed on a city roadside or a public place where many people pass). For example, in a preferred embodiment, limited restriction digital data may be uploaded once. If the user receives such a limited restriction digital data file and tries to upload the limited restriction digital data file from the digital data player 2 to the personal computer terminal 1, the personal computer terminal 1 determines on the basis of the ID code "10" that the digital data file has limited restrictions (e.g., was sold from the digital data vending machine 4) and permits that file to be uploaded only once. After permitting such uploading, the personal computer terminal 1 changes the ID code from "10" to "01" to inhibit further uploading. As a result, the user is able to upload the limited restriction digital data file only once to the personal computer terminal 1.

Fourthly, an ID code "11" is assigned to a header of a digital data file transmitted through a particular means, such as the encoder 5, and purchased under a desired contract with a supplier. In the case where the user downloads the digital data file through the encoder 5 and tries to upload the downloaded digital data file from the digital data player 2 to the personal computer terminal 1, the personal computer terminal 1 determines on the basis of the ID code "11" that the downloaded digital data file was transmitted through the encoder 5 and thus permits that file to be uploaded with no restriction.

While being described as resident at the personal computer terminal 1, the method according to the present invention is, in a further embodiment, initially stored as a program on a recording medium such as a magnetic or optical disk. This program is then uploaded to the personal computer terminal 1. Alternatively, this program forms part of the digital data player 2 transmitted to the personal computer terminal 1.

As apparent from the above description, according to the present invention, the digital data file is assigned with a code capable of identifying a provider. For example, when the digital data file is purchased at a charge and intended to be uploaded from the digital data player, it can be permitted to be uploaded under certain restrictions according to its code value. Therefore, the digital data file can be prevented from being illegally duplicated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transferring a digital data file comprising:
   connecting a digital data player or a memory of the digital data player to a communication network via a first personal computer;
   downloading a digital data file with an attached code segment from the communication network to the memory of the digital data player;
   connecting the digital data player or the memory of the digital data player to a second personal computer, different than the first personal computer;
   initiating an upload request to upload the digital data file from the memory of the digital data player to the second personal computer;
   uploading software from the digital data player to the second personal computer;

reading the code segment attached to the digital data file using the uploaded software in the second personal computer; and controlling whether or not the uploading of the digital data file is permitted to occur based upon the uploaded software in the second personal computer interpreting the code segment.

2. The method according to claim 1, wherein the software that reads the code segment and controls whether or not the uploading of the digital data file is permitted is downloaded from the communication network to the memory of the digital data player along with the digital data file with the attached code.

3. The method according to claim 1, wherein the memory of the digital data player is removable.

4. The method according to claim 1, wherein the communication network is the Internet.

5. The method according to claim 1, wherein the software permits the uploading of the digital data file to the second personal computer, and changes the code segment attached to the digital data file.

6. The method according to claim 5, wherein the changed code segment inhibits the digital data file from being uploaded to another computer at a later time.

7. The method according to claim 1, wherein the digital data file is encoded using a compression coding technique prescribed in MPEG 1, layer 3.

8. The method according to claim 1, wherein the code segment indicates a provider of the digital data file and is included in a header of the digital data file.

9. The method according to claim 1, wherein the digital data player is an MP3 player, and wherein the digital data file is a digital audio data file.

10. A method of transferring a digital data file comprising:
connecting a digital data player or a memory of the digital data player to a communication network via a vending machine;

downloading a digital data file with an attached code segment from the communication network to the memory of the digital data player;

connecting the digital data player or the memory of the digital data player to a personal computer, different than the vending machine;

initiating an upload request to upload the digital data file from the memory of the digital data player to the personal computer;

uploading software from the digital data player to the personal computer;

reading the code segment attached to the digital data file using the uploaded software in the personal computer; and controlling whether or not the uploading of the digital data file is permitted to occur based upon the uploaded software in the personal computer interpreting the code segment.

11. The method according to claim 10, wherein the software that reads the code segment and controls whether or not the uploading of the digital data file is permitted is downloaded from the vending machine or communication network to the memory of the digital data player along with the digital data file with the attached code.

12. The method according to claim 10, wherein the software permits the uploading of the digital data file to the personal computer, and changes the code segment attached to the digital data file.

13. The method according to claim 12, wherein the changed code segment inhibits the digital data file from being uploaded to another computer at a later time.

14. The method according to claim 10, wherein the digital data file is encoded using a compression coding technique prescribed in MPEG 1, layer 3.

15. The method according to claim 10, wherein the code segment indicates a provider of the digital data file and is included in a header of the digital data file.

16. The method according to claim 10, wherein the digital data player is an MP3 player, and wherein the digital data file is a digital audio data file.

* * * * *